(12) United States Patent
Resnick

(10) Patent No.: US 8,549,092 B2
(45) Date of Patent: Oct. 1, 2013

(54) MEMORY NETWORK METHODS, APPARATUS, AND SYSTEMS

(75) Inventor: David R. Resnick, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 1261 days.

(21) Appl. No.: 12/389,200

(22) Filed: Feb. 19, 2009

(65) Prior Publication Data

US 2010/0211721 A1    Aug. 19, 2010

(51) Int. Cl.
*G06F 15/167*    (2006.01)
*G06F 15/173*    (2006.01)

(52) U.S. Cl.
USPC .......................... 709/213; 709/225; 709/239

(58) Field of Classification Search
USPC .......................................... 709/213, 225, 239
See application file for complete search history.

(56) References Cited

U.S. PATENT DOCUMENTS

| | | | |
|---|---|---|---|
| 5,835,710 A | 11/1998 | Nagami et al. | |
| 7,124,200 B2 * | 10/2006 | Sato et al. | 709/239 |
| 7,535,760 B2 * | 5/2009 | Lee et al. | 365/185.08 |
| 7,603,428 B2 * | 10/2009 | Wittenschlaeger | 709/213 |
| 2006/0010181 A1 | 1/2006 | Eleftheriou et al. | |
| 2007/0250604 A1 * | 10/2007 | Wu et al. | 709/220 |
| 2009/0019258 A1 | 1/2009 | Shi | |
| 2009/0059641 A1 | 3/2009 | Jeddeloh | |
| 2009/0210600 A1 | 8/2009 | Jeddeloh | |

OTHER PUBLICATIONS

"International Application Serial No. PCT/US2010/024600, Search Report mailed Sep. 29, 2010", 5 pgs.
"International Application Serial No. PCT/US2010/024600, Written Opinion mailed Sep. 29, 2010", 4 pgs.

* cited by examiner

*Primary Examiner* — Minh-Chau Nguyen
(74) *Attorney, Agent, or Firm* — Schwegmen, Lundberg & Woessner, P.A.

(57) ABSTRACT

Apparatus and systems may include a first node group include a first network node coupled to a memory, the first network node including a first port, a second port, a processor port, and a hop port. Network node group may include a second network node coupled to a memory, the second network node including a first port, a second port, a processor port, and a hop port, the hop port of the second network node coupled to the hop port of the first network node and configured to communicate between the first network node and the second network node. Network node group may include a processor coupled to the processor port of the first network node and coupled to the processor port of the second network node, the processor configured to access the first memory through the first network node and the second memory through the second network node. Other apparatus, systems, and methods are disclosed.

17 Claims, 7 Drawing Sheets

MEMORY NETWORK METHODS, APPARATUS, AND SYSTEMS

BACKGROUND

Many electronic devices, such as personal computers, workstations, computer servers, mainframes and other computer-related equipment, including printers, scanners and hard disk drives, make use of memory that provides a large data storage capability, while attempting to incur low power consumption. One type of memory that is well suited for use in the foregoing devices is the dynamic random access memory (DRAM).

The demand for memory devices having increased capacity in large multi-processor systems continues to rise as chip size limitations provide a limiting influence. The surface area occupied by the components of individual memory cells has been steadily decreased so that the packing density of the memory cells on a semiconductor substrate can be increased along with the gate delays being decreased. However, shrinking the device surface area can result in reducing manufacturing yield, as well as increasing the complexity for interconnects used to connect the numerous banks of memory devices with other devices such as processors. Additionally, during miniaturization, interconnect delays do not scale as well as gate delays.

BRIEF DESCRIPTION OF THE DRAWINGS

Various embodiments are described in detail in the discussion below and with reference to the following drawings.

DETAILED DESCRIPTION

Various embodiments include processing systems, semiconductor modules, memory systems and methods. Specific details of several embodiments are set forth in the following description and in FIGS. 1 through 9 to provide an understanding of such embodiments. One of ordinary skill in the art, however, will understand that additional embodiments are possible, and that many embodiments may be practiced without several of the details disclosed in the following description. It is also understood that various embodiments may be implemented within a physical circuit that includes physical components (e.g., "hardware"), or they may be implemented using machine-readable instructions (e.g., "software"), or in some combination of physical components and machine-readable instructions (e.g., "firmware").

Surface area reduction and a consequent increase in the packing density of memories can be achieved by decreasing the horizontal feature size of memory arrays and devices. In various embodiments, this can occur by forming memory systems that are significantly three-dimensional, so that the memory devices extend vertically into and above the substrate, in addition to generally extending across the surface of the substrate.

Examples of memory devices discussed herein are described in U.S. patent application Ser. No. 11/847,113, entitled "MEMORY DEVICE INTERFACE METHODS, APPARATUS, AND SYSTEMS," filed on Aug. 29, 2007, and assigned to Micron Technology, Inc.

Examples of network nodes (routers) discussed herein are described in U.S. patent application Ser. No. 12/033,684, entitled "METHOD DEVICE WITH NETWORK ON CHIP METHODS, APPARATUS, AND SYSTEMS," filed on Feb. 19, 2008, and assigned to Micron Technology, Inc.

Figure 1:
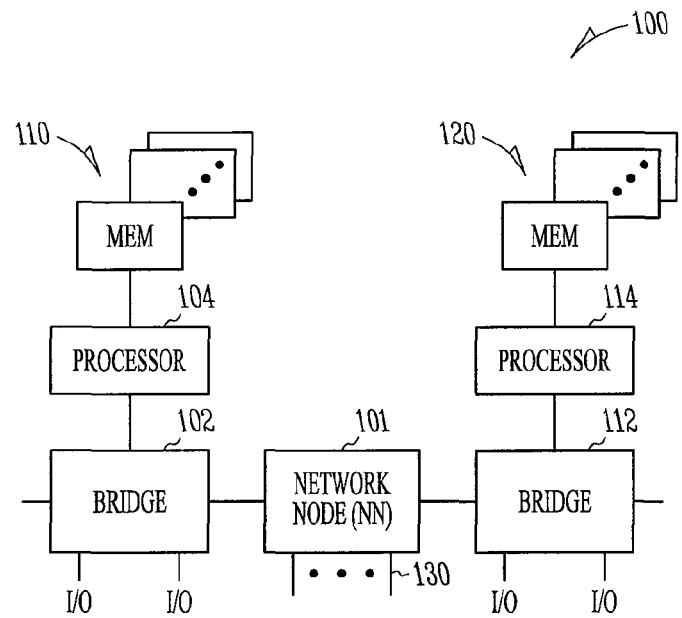
FIG. 1 is a diagrammatic block view of a bridge architecture for a memory system, according to various embodiments.

FIG. 1 is a diagrammatic block view of a bridge architecture for a memory system 100, according to various embodiments. In an example embodiment, memory system 100 includes processors (104, 114), memory (110, 120), bridges (102, 112), and a network node 101. In some embodiments, processor 104 is coupled to a dedicated memory 110 and a bridge 102. Architecture 100 also includes a processor 114 coupled to a dedicated memory 120 and a bridge 112. Network node 101 can be used to couple bridge 102 and bridge 112. In various embodiments, the architecture shown in FIG. 1 can be used in conjunction with other memory systems and architectures disclosed herein.

Figure 2:
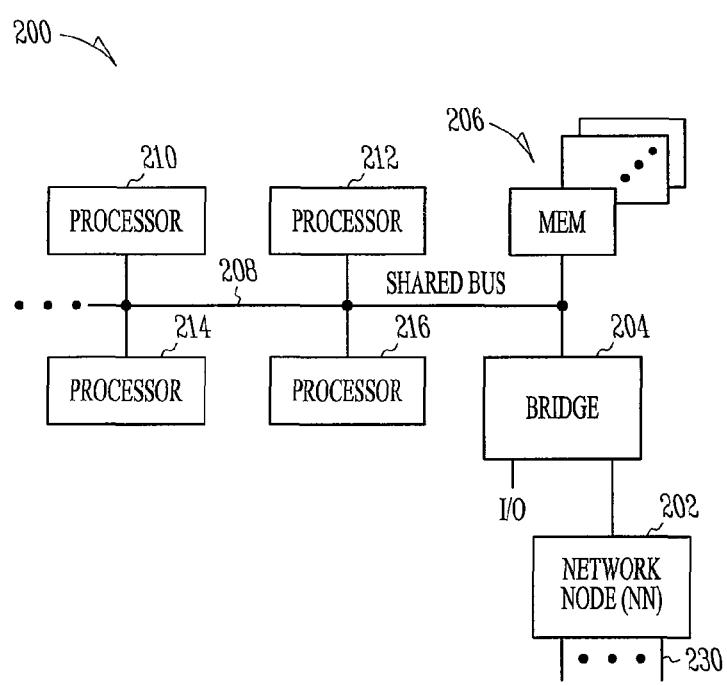
FIG. 2 is a diagrammatic block view of a shared bus architecture for a memory system, according to various embodiments.

FIG. 2 is a diagrammatic block view of a shared bus architecture for a memory system 200, according to various embodiments. Shared bus architecture 200 includes a shared bus 208 coupled to processors 210, 212, 214, and 216, a memory 206, and a bridge 204. In some embodiments, a network node 202 is coupled to the bridge 204 to connect memory system 200 to other similar memory systems. In various embodiments, the architecture shown in FIG. 2 can be used in conjunction with other memory systems and architectures disclosed herein.

Large multiprocessor systems can be built using either the bridge architecture shown in FIG. 1 or the shared bus architecture shown in FIG. 2. In both architectures the network structure and interconnect hardware can be used to provide a high performance networked system. In some embodiments, a variety of standard input/output (IO) channels (e.g., provided as part of an Infiniband™ communications link) and other mechanisms can be used to couple additional computational resources than that can be accommodated on a particular motherboard or similar packaging arrangement.

In the bridge architecture shown in FIG. 1, each processor (104, 114) has its own memory (110, 120) and possibly has its own IO capability. This means that software and performance issues may be created when processors share those resources. If one processor (for example, 104) needs data from another processor's memory (e.g., 120), the first processor (104) has to generate and send a request message to the second processor (114) asking for the data it needs, and then wait for the second processor (114) to stop what it is doing to service the request and reply back to the first processor (104). This means there can be significant performances losses due to software overhead that do contribute directly to computation-overhead as a result of the time loss waiting for needed data to be returned.

In the shared bus architecture shown in FIG. 2, the number of processors that can reasonably form part of the group is limited because of electrical power issues in constructing the bus and, to a larger extent, due to memory size and bandwidth constraints that are part of providing satisfactory service to the connected processors. Shared bus systems are often self-limiting, and thus often grow using network or IO channel interconnects to scale for larger systems. This reintroduces the same losses and issues described above for the bridge architecture.

In some embodiments, combining the network structure and memory used to support multiple processors that make up a distributed system allows for envisioning new ways of system construction. If this can be achieved, system performance can be improved, making it easier and faster to perform data sharing. Data can be accessed using a network request, no matter where the requested data resides within a network. In some embodiments, memory systems using interconnects similar to that shown in FIG. 3 can be built.

Figure 3:
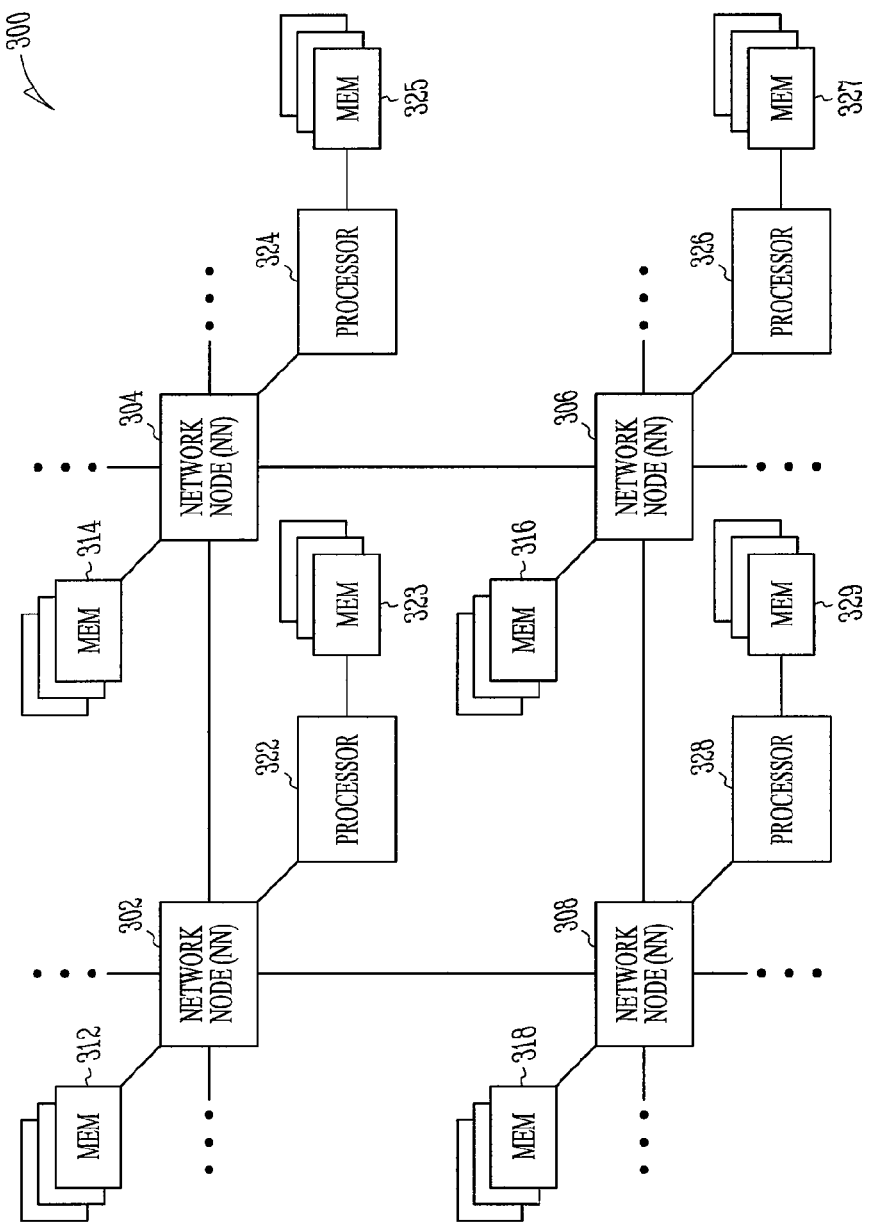
FIG. 3 is a diagrammatic block view of a network architecture for a memory system showing interconnected network nodes having dedicated processors, according to various embodiments.

FIG. 3 is a diagrammatic block view of a network architecture for a memory system 300 showing interconnected network nodes (302, 304, 306, 308) coupled to dedicated processors (322, 324, 326, 328), according to various embodiments. While a two-dimensional mesh network is shown here, the concept is easily extended to three or more dimensions (e.g., hypercube), torus structures, etc. Other kinds of network architectures (e.g., Clos network variations) can also be used, depending on system requirements and on the level of complexity that can be supported by the network node logic.

In some embodiments, the processors shown in FIG. 3 can include multiple processors within a single package or die (multi- or many-core processors) or multiple independent processors that connect to a single network node (e.g., 302, 304, 306, and 308). In some embodiments, each processor (322, 324, 326, and 328) has a memory (312, 314, 316, and 318) attached to it. This arrangement provides local storage of intermediate values from calculations preformed by a particular processor, which are not available to processors situated in other parts of the memory system 300. However, if some of the processors request access to data distributed between various memory (312, 314, 316, and 318), then various data management issues can be raised as a result of using memory referencing schemes. In various embodiments, the architecture shown in FIG. 3 can be used in conjunction with other memory systems and architectures disclosed herein.

One of the many potential benefits of using the distributed memory networks described herein is that all the memory can appear as a single set of addresses in the network; avoiding the need to build request messages from one process to another to access data. Memory latency (access time) is non-uniform in these memory structures, so there may be a performance benefit to having job and data management software keeping data close to the processors that use the data. In addition, the impact of not keeping the data close to the processors is less than that for the network-memory structures shown in FIG. 1 because there is no need for message passing to send and receive data.

Sometimes, performance issues arise when using multi-core processor integrated circuits (ICs). As the number of cores within a single IC increases, the arrangement effectively looks more and more like the bus architecture shown in FIG. 2. In this case, bandwidth is shared, and as the number of cores and threads increase, the fraction of available bandwidth per core or thread may be reduced.

Figure 4:
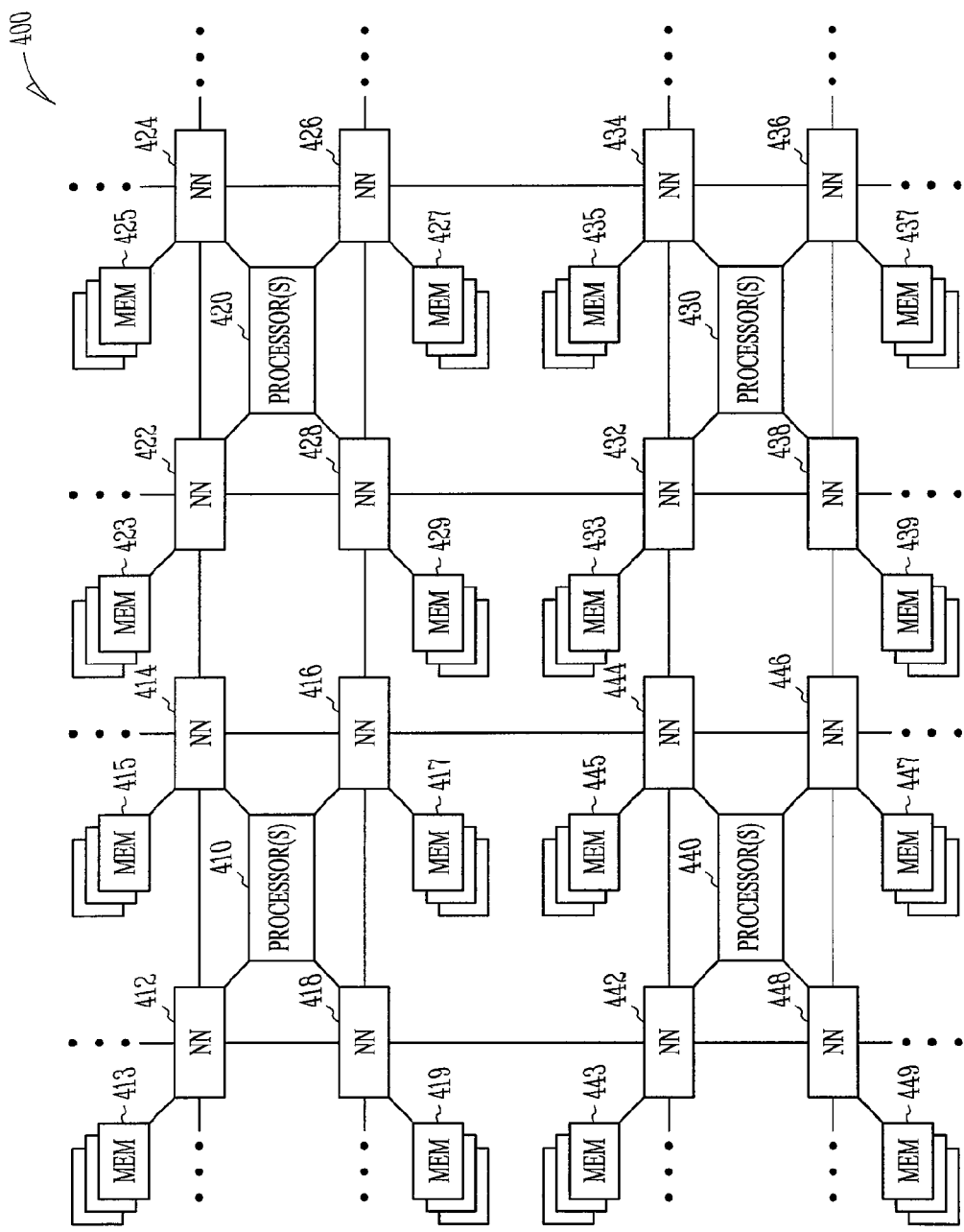
FIG. 4 is a diagrammatic block view of a network architecture for a memory system showing interconnected network nodes sharing processors, according to various embodiments.

FIG. 4 is a diagrammatic block view of a network architecture for a memory system 400 showing interconnected network nodes sharing processors, according to various embodiments. Memory system 400 includes network nodes (412, 414, 416, 418, 422, 424, 426, 428, 432, 434, 436, 438, 442, 444, 446, 448), memory (413, 415, 417, 419, 423, 425, 427, 429, 433, 435, 437, 439, 443, 445, 447, 449), and processors (410, 420, 430, 440).

As shown in FIG. 4, memory 413 is coupled to network node 412, memory 415 is coupled to network node 414, memory 417 is coupled to network node 416, and memory 419 is coupled to network node 418. Processor 410 is coupled to network nodes 412, 414, 416, and 418.

Memory 423 is coupled to network node 422, memory 425 is coupled to network node 424, memory 427 is coupled to network node 426, and memory 429 is coupled to network node 428. Processor 420 is coupled to network nodes 422, 424, 426, and 428.

Memory 433 is coupled to network node 432, memory 435 is coupled to network node 434, memory 437 is coupled to network node 436, and memory 439 is coupled to network node 438. Processor 430 is coupled to network nodes 432, 434, 436, and 438.

Memory 443 is coupled to network node 442, memory 445 is coupled to network node 444, memory 447 is coupled to network node 446, and memory 449 is coupled to network node 448. Processor 440 is coupled to network nodes 442, 444, 446, and 448.

In some embodiments, high-speed serial interfaces are provided for network interconnection of the processor with multiple paths, each of considerable bandwidth that can all run in parallel. This means that each processor package can be connected to multiple network nodes, providing memory access parallelism and allowing for memory/network structures that increase the benefits of such structures over most others that are currently available.

In some embodiments, the memory network shown in FIG. 4 can be multidimensional, perhaps having a torus structure, etc. Each of the processors (410, 420, 430, and 440) can have a bandwidth that is a multiple of the bandwidth of the memory and network nodes shown in FIG. 3. In some embodiments, where a three-dimensional (3D) network interconnect can be used, there is an option to keep each processor connected to the network nodes as shown in FIG. 4 (as a result various spatial planes or dimensions may be used for connections) or to have one or more processors be connected to network nodes in two or more spatial planes or dimensions. One of the concerns with developing network structures that have multiple dimensions (such as having multiple source and destinations, as in Clos networks) can be that the resulting network logic is quite complex, with the complexity sometimes growing as the square of the number of paths through each network node.

One way to simplify the design is to take advantage of multiple paths that can originate with each processor (410, 420, 430, and 440), so as to have each path going to separate memory networks along different physical dimensions (e.g., X, Y, Z dimensions). In some embodiments, if each processor (410, 420, 430 and 440) has three network-memory paths then there can be three different two-dimensional (2D) mesh networks, one network for each dimension, instead of a single 3D network. This arrangement may produce smaller 2D networks that are a fraction of the size, and have a smaller number of paths through the logic in each network node.

Figure 5:
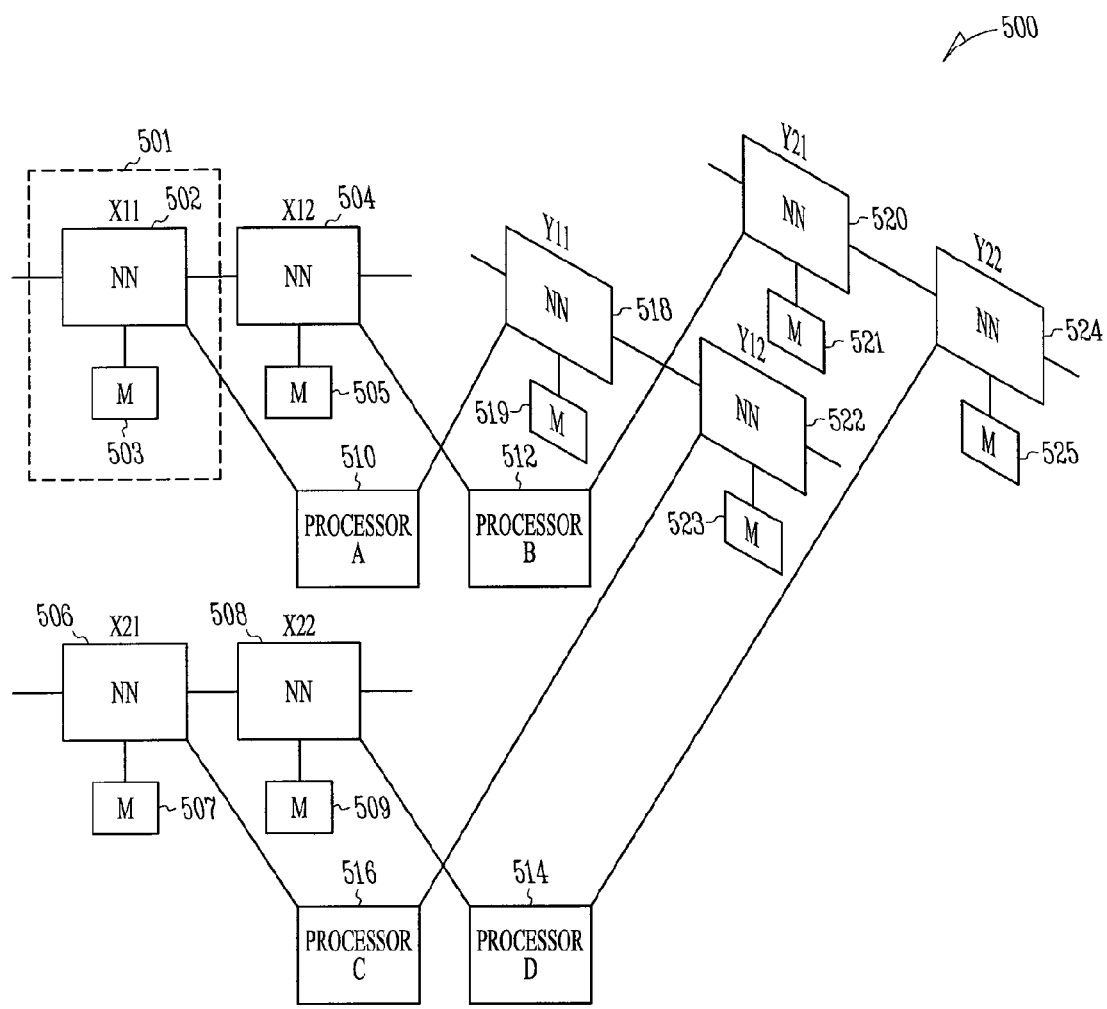
FIG. 5 is a diagrammatic block view of a network architecture for a memory system showing network nodes placed in different geometric planes sharing processors, according to various embodiments.

FIG. 5 is a diagrammatic block view of a network architecture for a memory system 500 showing network nodes placed in different geometric planes sharing processors, according to various embodiments. FIG. 5 shows a set of one-dimensional networks interconnected through the processors (510, 512, 514, and 516) to form a 2D network. Each network node shown in FIG. 5 has a maximum of two connections for the network, as each network node only handles a single dimension, and connections for the local memory and for a processor, rather than two connections for each network dimension, along with the memory and processor. In one embodiment, memory system 500 includes an integrated package 501 comprising a network node 502, and memory 503.

The memory network shown in FIG. 5 scales similarly to the networks shown in FIG. 3 and FIG. 4, and can be built for any specified network size. In some embodiments, memory networks of a greater number of dimensions can be reasonably constructed by adding a path for each added dimension from each processor. This implementation is further described below.

In some embodiments, complex network strictures can be built to have a multiple processor chip connecting to different points within the networks. For example, consider connecting processor 510 to network node 502 (X11) and network node 518 (Y11), and connecting processor 512 to network node 504 (X12) and network node 520 (Y21). In some embodiments, one of the characteristics of such a network can be that network communications and data might pass through the processors (510, 512, 514, and 516) to get data, which can be distributed over the memory network.

For example, if processor A (510), which has immediate access to memory data in memory 503 and 519 (coupled to network nodes 502 (X11) and 518 (Y11), respectively), wants data from memory 505 (coupled to network node 504 (X12)), a request signal is transferred through X11 to X12, which, after accessing the data, returns it by reversing the request path. If data, however is needed from network node 524 (Y22) then the request might be sent over the following path:

Processor A (510)→ X11→ X12→ Processor B (512) → Y21→ Y22.

In some embodiments if the needed data is not on the same X or Y path as that of the requesting processor, then the request (and the response) can be sent through another processor. This arrangement of having processors designed to simply pass through requests and responses is not usually an efficient way to improve processor performance, to reduce system power requirements, or to simplify packaging.

In some embodiments, the architecture can be modified so that network node pairs that are connected to a same processor (e.g., a same processor core) also include a network link between them, providing a "hop" path. The result can be something like that shown in FIG. 6.

Figure 6:
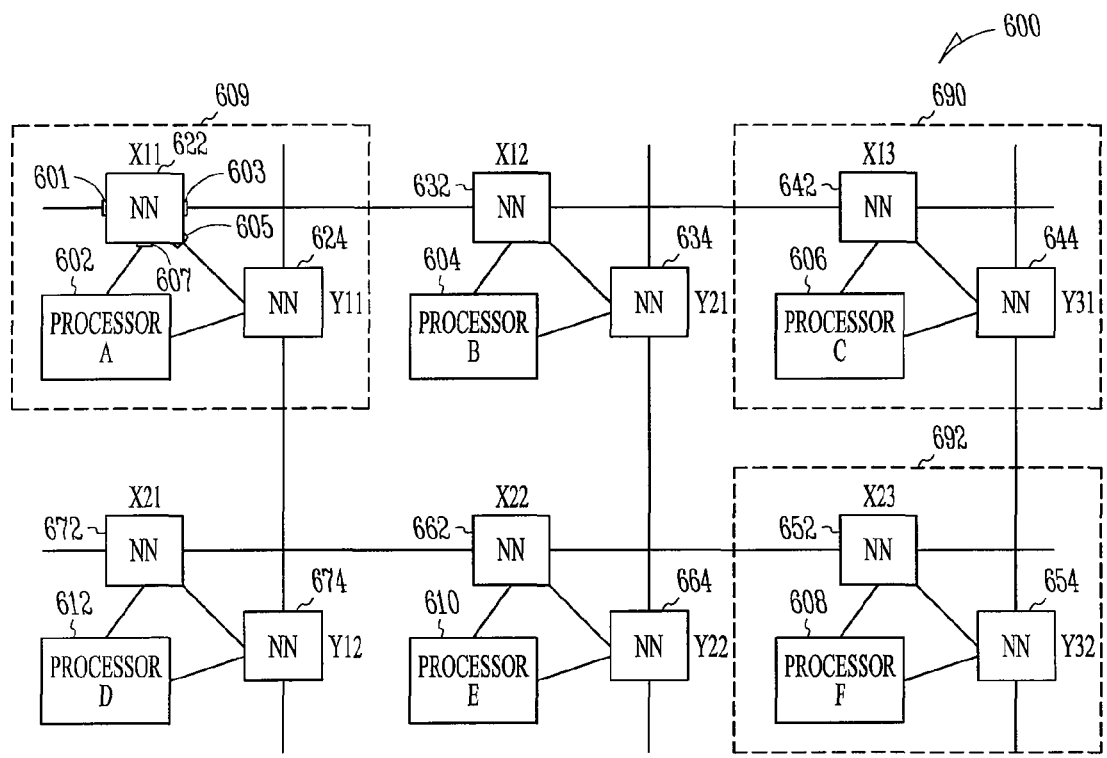
FIG. 6 is a diagrammatic block view of a network architecture for a memory system showing network nodes placed in different spatial planes that are interconnected to each other and share processors, according to various embodiments.

FIG. 6 is a diagrammatic block view of a network architecture for a memory system 600 showing network nodes placed in different geometric planes that are interconnected to each other and share processors, according to various embodiments. Although FIG. 6 does not show the memory connected to each network node, it should be understood as being present. Similarly, the arrangement shown in FIG. 6 is only one of many that are possible.

In some embodiments, memory system 600 includes an integrated package 609 comprising a network node 622 and a processor 602. In an example embodiment, network node 622 includes a left port 601, a right port 603, and a hop port 605. The configuration shown in FIG. 6 adds an extra link to the network nodes (622, 624, 632, 634, 642, 644, 652, 654, 662, 664, 672, and 674), thereby avoiding routing network traffic through the processors 602-612. Each network node (for e.g network node 622) in FIG. 6 has three ports (e.g., left port 601, right port 603, and hop 605) that are used to couple to other network nodes and a port (e.g., 607) to couple to the processor (e.g., Processor A (602)). The terms left port, right port do not denote any specific physical location on the node but instead they merely designate one of two ports on the device. In using such a network, requests from any processor (602, 604, 606, 608, 610, and 612) can be received by either of the corresponding network nodes connected to it. A minimum length path can follow a Manhattan routing scheme with the additional rule that the last routing dimension should be in the dimension that corresponds to the network node placement. For example, if processor A (602) wants to get data from network node 654 (Y32), the request path can be something like the following:

X11→ X12→ X13→ Y31→ Y32.

In some embodiments, if the data from network node 652 (X23) is needed instead, then the path can be something like the following:

Y11→ Y12→ X21→ X22→ X23.

In some embodiments, when a request is injected into the network by a processor, the message traverses nodes in the injected dimension until the request arrives at the correct address corresponding to another dimension. In some embodiments, if the data is not in the node, then the request is automatically sent down the "hop" path to the other node in the node pair and then down the network path in the other dimension until it arrives at the correct node. For example, the hop port 605 is used when the data from memory connected to network X23 is requested at network node X11.

The configuration shown in FIG. 6 includes a node group 690 coupled to a node group 692. In some examples, node group 690 includes network nodes 642, 644, and processor 606. In some examples, the node group 692 includes network nodes 652 and 654, and processor 608. In some embodiments, network node 642 is coupled to a first memory (not shown in FIG. 6), and network node 652 is coupled to a second memory (not shown in FIG. 6). Each of network nodes 642 and 652 include a left port, a right port and a hop port in addition to the processor port that is used to couple to the processors 606 and 608, respectively.

In some embodiments memory system 600 includes a network node 622 disposed in an x-path, the network node 622 including a first x-path port (601), a second x-path port (603), a hop path port (605) and a processor port to couple to processor 602. In some embodiments, memory system 600 includes a network node (624) disposed in a y-path, the network node 624 including a first y-path port, a second y-path port, a processor port and a hop path port. In some embodiments, memory system 600 includes a third network node disposed in a z-path, the third network node including a first z-path port, a second z-path port, a processor port and two hop path ports.

Figure 7:
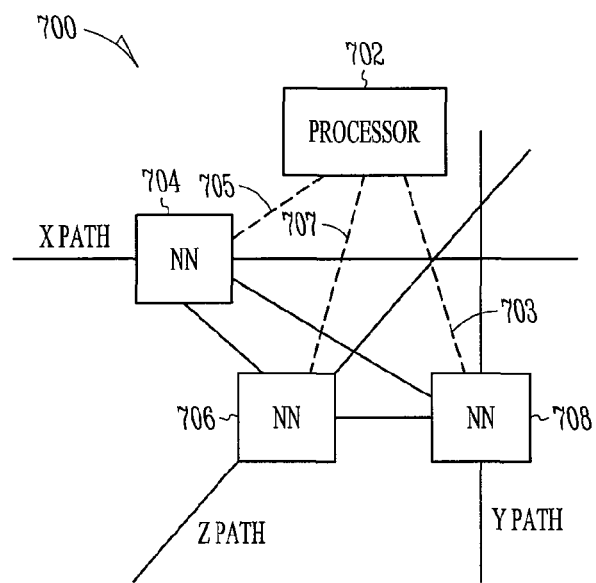
FIG. 7 is a diagrammatic block view of a three dimensional memory system showing network nodes interconnected with each other and sharing a processor, according to various embodiments.

FIG. 7 is a diagrammatic block view of a three-dimensional memory system showing a node group 700 having network nodes (704, 706, and 708) interconnected with each other and coupled to a processor (702), according to various embodiments. Processor 702 is coupled to network node 704 (disposed in the X-path) along a path using processor link 705. Processor 702 is coupled to network node 708 (disposed in the Y-path) along a path using processor link 706. Processor 702 is coupled to network node 706 (disposed in the Z-path) along a path using processor link 707.

Thus, it can be noted that if the architecture shown in FIG. 6 is extended to three dimensions, the result is something like that shown in FIG. 7, which illustrates a single network node group. In a similar way, this concept can be extended even further, using an additional processor path for each added network dimension, for example, to construct a four-dimensional network. N-dimensional networks can be constructed in this manner.

In most cases of multi-dimensional networks, when a hop path is taken to change network dimension, only a single hop to the next node component in a node group may be taken. This activity distributes requests to minimize path conflicts and network hot-spots. If a request is sent from a node in the X-path to a node in the Y-path, and the final destination node is not located in the Y-dimension, then the request can be transferred on to the next dimension, Z.

Figure 8:
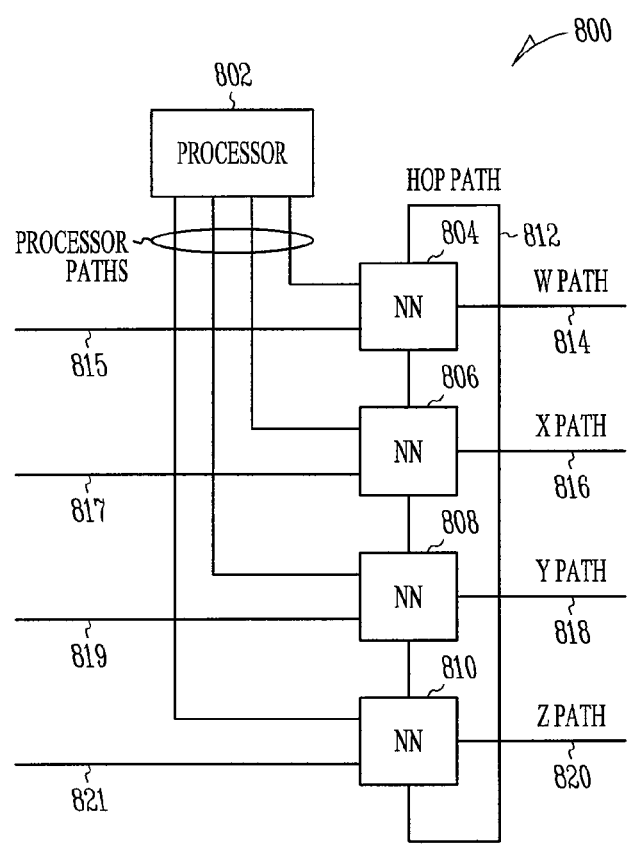
FIG. 8 is a diagrammatic block view of a memory system that allows for network fault recovery while recovering data from memory in a multi-dimensional memory network, according to various embodiments.

FIG. 8 is a diagrammatic block view of a memory system 800 that allows for network fault recovery while recovering data from memory in a multi-dimensional memory network, according to various embodiments. Memory system 800 includes a processor 802, network nodes (804, 806, 808, and 810), and hop path 812. Processor 802 is coupled to network nodes 804, 806, 808, and 810. Network nodes 804, 806, 808, and 810 are connected to paths 815, 817, 819, and 821 that in turn may be connected to other network nodes. Network node 804 is disposed in a W-path (814, 815), network node 806 is disposed in an X-path (816, 817), network node 808 is disposed in a Y-path (818, 819), and network node 810 is disposed in a Z-path (820, 821). In some embodiments, processor 802 comprises a substrate with more than one embedded processors.

With the network structure shown in FIG. 8, each node in the multidimensional network can have components tasked to handle only a single network dimension, so that the resulting network structure has great resiliency. Referring back to FIG. 6, if the processor D wants to get data from the memory attached to network node 644 (Y31), the request would normally go along the following path: Processor D → X21 → X22 → X23 → Y32 → Y31. However, if the path between X22 and X23 is down (e.g., X23 has totally failed) when a request arrives at a node (such as X22) from which the desired path cannot be taken, the local logic simply sends the request to a hop path (e.g., 812) along with a flag that contains information indicating that the preferred routing dimension (the X dimension) is not to be used for the next network hop. In some embodiments, the flag provides the processor 802 information to determine as to what the new minimum path would be for future requests. Consequently, X22 will be able to send the requests to Y22. The rerouted request arriving at Y22 is then sent to Y21. The request then follows the path Y21 → X12 → X13 → Y31.

In another example, assume that instead of the path between X22 and X23 failing, the hop path between X23 and Y32 fails. As a result, the request arriving at X23 is sent on to X24 (not shown) along with a flag indicating that the preferred dimension is not to be used for the next hop. The request will then be sent into the Y-dimension, reaching Y31 after a few more hops.

Broken links in the network may also occur along the final network dimension. For example, consider that processor D wants data from X23, and the link from X21 to X22 is down.

Node X21 sends the request to Y12 using the previous rule of taking the hop path if the desired path is down, along with generating a flag that provides for routing in the non-preferred dimension first. Y12 notes that there is zero Y network distance to be covered. As a result, Y21 can send the request to Y11 or to Y13 (not shown). Assuming that Y11 was chosen, the request will go to Y11, which then sends the request along the path Y11 → X11 → X12 → Y21 → Y22 → X22 → X23. If the network node X22 has failed, then the path is broken in the Y22 to X22 link. In that case, the request will be sent to Y23 (not shown), reaching X23 after more hops. This occurs because the request has to find another route to get back into the X-dimension at a node close to X23 or at X23.

Figure 9:
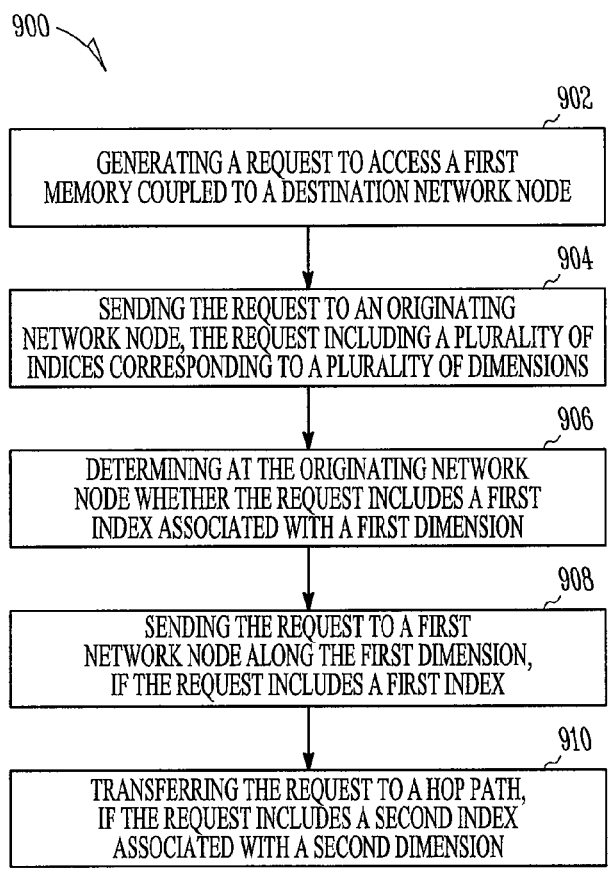
FIG. 9 is a flowchart that describes a method of routing data in a multi-dimensional memory system, according to various embodiments.

FIG. 9 is a flowchart that describes a method 900 of routing data in a multi-dimensional memory system, according to various embodiments. As shown below various network routing rules can be followed to access memory in a multi-dimensional memory network described herein. In the embodiments described herein, an "index" represents the location of a node in a particular dimension (e.g., X, Y, or Z-dimension). The number of indices used to locate a node includes At block 902, method 900 includes generating a request to access a first memory coupled to a destination network node.

At block 904, method 900 includes sending the request to an originating network node, the request including a plurality of indices corresponding to a plurality of dimensions.

At block 906, method 900 includes determining the originating network node whether the request includes a first index associated with a first dimension.

At block 908, method 900 includes sending the request to a first network node along the first dimension, if the request includes a first index.

At block 910, method 900 includes transferring the request to a hop path, if the request includes a second index associated with a second dimension.

In some embodiments, simple rules can provide network resiliency by automatically routing requests around failed network components and paths. Using such rules, network data flow management can be provided within each network node. In some embodiments, the routing rules can include at least one of the following:

Rule—1: If a request indicates that the request should flow in a particular dimension (e.g., along an X-path, Y-path, Z-path or W-path) of the network, then send the request to a next node in that dimension.

Rule—2: If a request is at the correct node location for the network dimension (for example, the request is traveling along the X dimension and arrives at the Y index corresponding to the destination node), but has not arrived at its destination, send the request to the local hop path.

Rule—3: If it is desirable to proceed in the current network path dimension, but the request cannot (e.g., due to a path error or failure), then send the request to the hop path and set a flag to prevent returning to the sending node/route in a non-preferred dimension).

Rule—4: If the request uses a hop path, but it is found to be impossible to proceed to a node residing in a desired dimension, then simply send the request to the next node and set a flag to prevent any return to the sending node/route using a non-preferred dimension.

Rule—5: If making a memory request, traverse the network in a specific dimension order, with the dimension of the address of the destination node being the last dimension in the specified order. Thus, if memory coupled to Y21 is to be accessed for example, in a 3D network where the order of choosing the dimensions is X → Y → Z, then a request sent to the local Z node for a requesting processor is sent along the order Z→X→Y. This can result in distributing requests across network components and minimizing the number of path hops in a request.

Rule—6: Replies to request are not constrained to follow the same return path as a request, but may occur in a reverse order. This can help distribute responses within the network.

In some embodiments, because a network node becomes a distributed entity for these networks, loss of a node component will not take down all communication through the failed node, but only along the path corresponding to the network dimension of the failing component. As described below, getting around such failures may be managed.

In some embodiments, networks of most any dimensionality and scale can be built using a single kind of network node. Higher dimensional networks may have shorter network latencies and higher bidirectional bandwidths than lower dimensional networks; in each case a single kind of network-memory component can be the building block.

In some embodiments, each network node component may be simplified to contain five or fewer bidirectional ports, one of them dedicated to a processor port. In some embodiments, system memory can be contained within each network component, so that system memory scales with the network, independent of the number of network processors and the capability of the processors, depending on how the network is built and configured. Recovery from network errors may then be simplified and automated.

With multiple network/memory nodes connected to each processor IC for higher dimensional networks, processors may have a higher level of memory and network access parallelism for higher local memory bandwidths and reduced average memory latency. In situations where processors have more paths available than the number of dimensions needed for an envisioned network, the processors can have two or more paths that travel in the same dimension.

In some embodiments, where node groups do not include any processors, one way to increase the memory size and packaging density includes adding network nodes that increase the total system memory. These added nodes can leave out processing capabilities if not needed. For example, network groups can be provided such that they support different kinds of IO capabilities. A network node can be optimized for, or designated for IO functions rather than for computation.

In some embodiments, a network can be formed in which one of the network dimensions is used by IO processors or other type of special processors. For example, in a 3D network, one plane of processors may comprise inter-mixed IO and signal processors. In this way, data may be moved in the IO signal plane without interfering with data traffic between the computational nodes.

In some embodiments, processors described herein may comprise a single integrated circuit having one or more processing units (e.g., cores). Multiple processors can be connected to each network node, which may comprise an integrated circuit that routes data between a memory and processor. Processors, network nodes and memory can reside on the same integrated circuit package. In some embodiments, such processors comprise a single-core processor, a multi-core processor, or a combination of the two. In some embodiments, the processor of a particular node group includes one or more cores of a multi-core processor. In some embodiments, processors include an application specific integrated circuit (ASIC).

In some embodiments, the network node described herein includes an IO driver circuit. In some embodiments, the network node and the memory are disposed within a single package. In some embodiments, the network node, the memory and the processor are disposed in a single package. In some embodiments, the network node is configured to perform Error Check and Correction (ECC) during data communication between the memory and processor. Network nodes can include routers provided to route data between memory and processors across a memory network. In some embodiments, network nodes include an interface device that has a plurality of routing elements.

In some embodiments, the memory discussed herein includes Dynamic Random Access Memory (DRAM) arrays. In some embodiments, the memory discussed herein includes a NAND flash memory array. In some embodiments, the memory discussed herein includes a NOR flash memory array. In some embodiments, the memory size can be proportional to the network dimensionality. Local memory bandwidth can be proportional to the network dimensionality as well.

While various embodiments have been illustrated and described, as noted above, changes can be made without departing from the disclosure. The accompanying drawings that form a part hereof show by way of illustration, and not of limitation, various embodiments in which the subject matter may be practiced. The embodiments illustrated are described in sufficient detail to enable those skilled in the art to practice the teachings disclosed herein. Other embodiments may be utilized and derived there from. This Detailed Description, therefore, is not to be taken in a limiting sense.

Although specific embodiments have been illustrated and described herein, it should be appreciated that any arrangement calculated to achieve the same purpose may be substituted for the various embodiments shown. Furthermore, although the various embodiments have described redundant signal transmission systems, it is understood that the various embodiments may be employed in a variety of known electronic systems and devices without modification. This disclosure is intended to cover any and all adaptations or variations of various embodiments. Combinations of the above embodiments, and other embodiments not specifically described herein, will be apparent to those skilled in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the meaning of the claims. In addition, in the foregoing Detailed Description, it can be seen that various features may be grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:
1. An apparatus comprising:
 a first node group including:
  a first network node coupled to a first memory, the first network node including a first port, a second port, a processor port, and a hop port;
  a second network node coupled to a second memory, the second network node including a first port, a second port, a processor port, and a hop port, the hop port of the second network node coupled to the hop port of the first network node providing a hop path, the hop port of the second network node and the hop port of the first network node configured to communicate between the first network node and the second network node such that a request at the first network node, for data not in the first network node and not in the first memory coupled to the first network node, is automatically sent via the hop path to the second network node prior to being sent to another node group if the data is not in the second network node and not in the second memory coupled to the second network node; and a processor coupled to the processor port of the first network node and coupled to the processor port of the second network node, the processor configured to access the first memory through the first network node and the second memory through the second network node.

2. The apparatus of claim 1, configured to communicatively couple to a second node group, the second node group comprising:

a third network node coupled to a memory, the third network node including a first port, a second port, a processor port, and a hop port;

a fourth network node coupled to a memory, the fourth network node including a first port, a second port, a processor port, and a hop port, the hop port of the fourth network node coupled to the hop port of the third network node; and a second processor coupled to the third network node using the processor port of the third network node and coupled to the fourth network node using the processor port of the fourth network node, wherein one of the first and second ports of the third network node is coupled to one of the first and second ports of the first network node.

3. The apparatus of claim 1, wherein the memory coupled to the first network node comprises at least one Dynamic Random Access Memory (DRAM) array.

4. The apparatus of claim 1, wherein the first network node comprises an input/output driver circuit.

5. The apparatus of claim 1, wherein the first network node and the memory coupled to the first network node are disposed in a single package.

6. The apparatus of claim 1, wherein the first network node, the memory coupled to the first network node and the processor coupled to the first network node are disposed in a single package.

7. The apparatus of claim 1, wherein the second network node and the memory coupled to the second network node is disposed in a single package.

8. The apparatus of claim 1, wherein the second network node, the memory coupled to the second network node and the processor coupled to the second network node are disposed in a single package.

9. The apparatus of claim 1, wherein the first network node is configured to perform Error Check and Correction (ECC) during data communication between the first memory and the first processor.

10. The apparatus of claim 1, wherein the memory coupled to the first network node comprises a NAND flash memory array.

11. The apparatus of claim 1, wherein the memory coupled to the first network node comprises a NOR flash memory array.

12. The apparatus of claim 1, wherein the processor coupled to the first network node comprises a single-core processor.

13. The apparatus of claim 1, wherein the processor coupled to the first network node comprises a multi-core processor.

14. The apparatus of claim 1, wherein the processor coupled to the first network node is a single core of a multi-core processor.

15. The apparatus of claim 1, wherein the processor coupled to the first network node comprises an Application Specific Integrated Circuit (ASIC).

16. The apparatus of claim 1, wherein the processor coupled to the first network node comprises a substrate with embedded processors.

17. The apparatus of claim 1, wherein the apparatus includes a memory network in which the first node group and associated memories are disposed, the memory network structured to operate with a single set of addresses in the network.

* * * * *

UNITED STATES PATENT AND TRADEMARK OFFICE
CERTIFICATE OF CORRECTION

PATENT NO.         : 8,549,092 B2                                             Page 1 of 1
APPLICATION NO.    : 12/389200
DATED              : October 1, 2013
INVENTOR(S)        : David R. Resnick It is certified that error appears in the above-identified patent and that said Letters Patent is hereby corrected as shown below:

On Title page, Item (74), under "Attorney, Agent, or Firm", column 2, line 1, delete "Schwegmen," and insert -- Schwegman, --, therefor.

Signed and Sealed this
Twenty-eighth Day of January, 2014

Michelle K. Lee
*Deputy Director of the United States Patent and Trademark Office*